United States Patent [19]

Peiffer et al.

[11] Patent Number: 4,894,422
[45] Date of Patent: Jan. 16, 1990

[54] N-SULFOALKYL POLYAMIDE WATER SOLUBLE HYDROPHOBICALLY-ASSOCIATING RIGID ROD POLYMER

[75] Inventors: Dennis G. Peiffer, East Brunswick; Jeff J. Kaladas, South Bound Brook, both of N.J.

[73] Assignee: Exxon Research & Engineering Company, Florham Park, N.J.

[21] Appl. No.: 286,098

[22] Filed: Dec. 19, 1988

Related U.S. Application Data

[63] Continuation-in-part of Ser. No. 135,973, Dec. 21, 1987, abandoned.

[51] Int. Cl.$^4$ .............................................. C08G 69/48
[52] U.S. Cl. .................................. 525/420; 524/606; 524/608; 528/337
[58] Field of Search .............. 525/420; 528/337; 524/608, 606

[56] References Cited

U.S. PATENT DOCUMENTS

| | | | |
|---|---|---|---|
| 3,454,535 | 7/1969 | Bodesheim et al. | 528/321 |
| 4,814,399 | 3/1989 | Sansone et al. | 525/420 |
| 4,822,863 | 4/1989 | Ford | 525/420 |
| 4,824,916 | 4/1989 | Kershner et al. | 525/420 |

Primary Examiner—Harold D. Anderson
Attorney, Agent, or Firm—Richard E. Nanfeldt

[57] ABSTRACT

A water soluble or brine soluble rod-like polymer characterized by the formula:

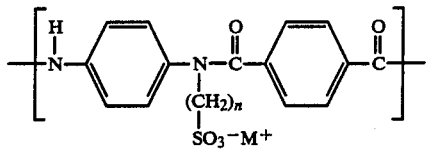

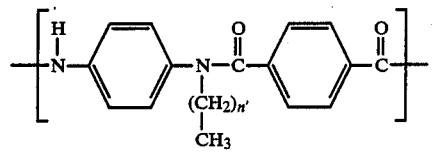

wherein n and n' are a 2 to 22 straight chained or branched chained alkyl or cycloalkyl group, and the level of sulfonation is about 20 to about 100 mole %, and M is a tertiary amine or a metal cation selected from the group consisting of alumina, iron, lead, Groups IA, IIA, IB ad IIB of the Periodic Table of Elements and level of alkylation is about 1.0 to 60 mole %.

3 Claims, 6 Drawing Sheets

FIG. I

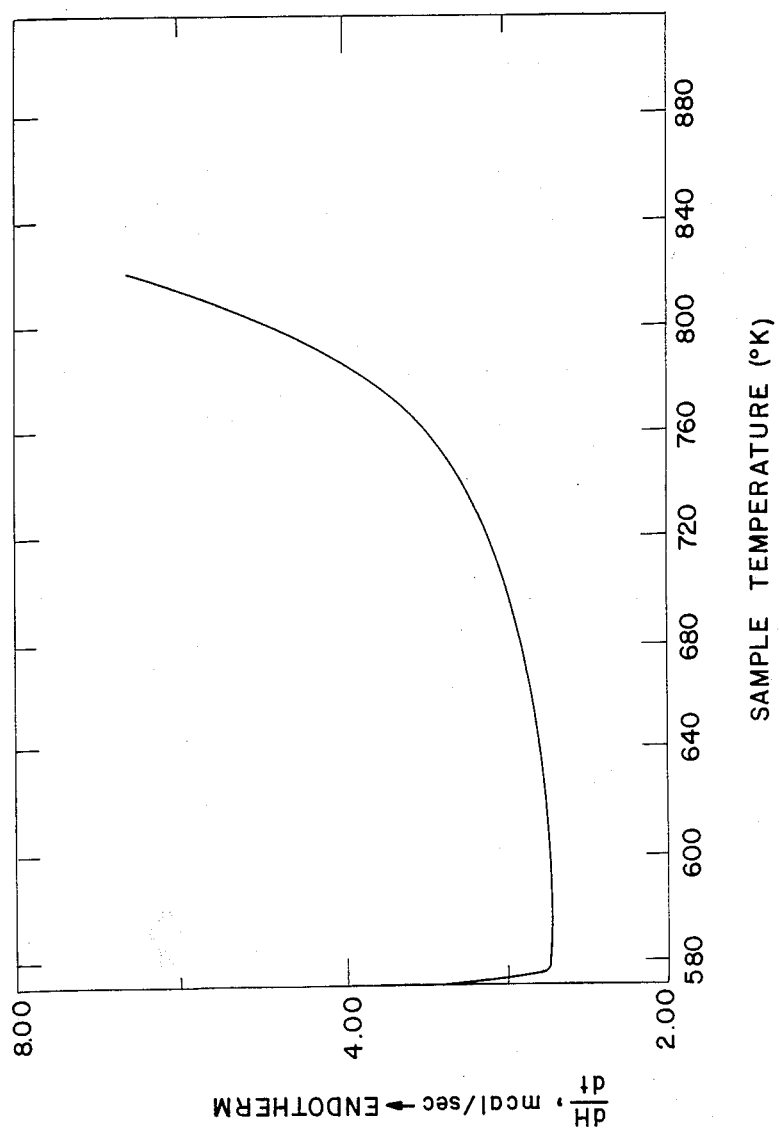

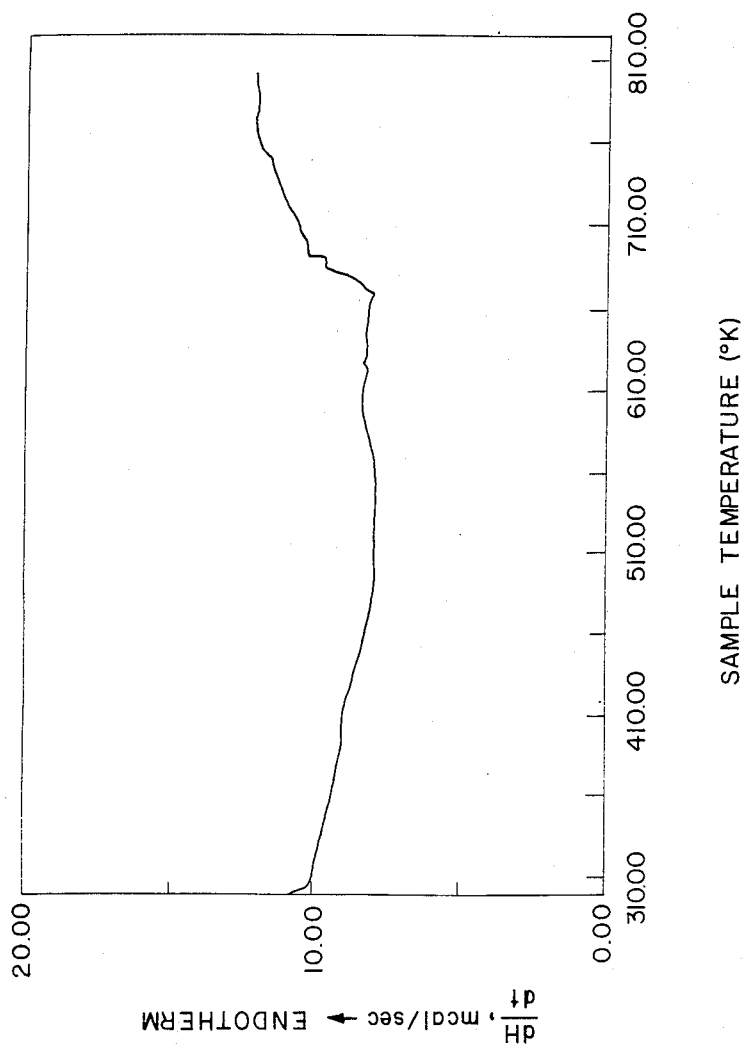

N-SULFOALKYL POLYAMIDE WATER SOLUBLE HYDROPHOBICALLY-ASSOCIATING RIGID ROD POLYMER

This application is a continuation-in-part of U.S. Ser. No. 135,973, filed Dec. 21, 1987, now abandoned.

FIELD OF THE INVENTION

The present invention describes a novel family of sulfonate-containing hydrophobically-associating rigid rods. These copolymer form aqueous solutions that possess markedly different rheological properties than conventional water soluble random coil polymers especially in high ionic strength solutions.

BACKGROUND OF THE INVENTION

It is well known that flexible polymer chains are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a soluble polymer is useful for thickening solvent, while a water soluble polymer is appropriate for increasing the viscosity of aqueous systems. With regard to aqueous solution, solvent soluble nonionic polymers and high charge density sulfonate or carboxylate polyelectrolytes are quite useful in this regard and are commonly used materials. However, the solution properties of the former family of material are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply $C^*$. It should be noted that in most nonionic polymers of commercial interest, a relatively large amount of polymer is required prior to reaching $C^*$. Therefore, this approach is undesirable from a economic viewpoint. Moreover, the rheological properties of many of these nonionic systems have been published. The results of these studies show that, in general, these solutions are shear thinning over all shear rates investigated.

Polyelectrolytes, on the other hand, are very useful and the most commonly used materials. However, the solution properties of these materials begin to deteriorate as low molecular additives (i.e., acids bases or salts) are dissolved in the solution. These additives screen the charges that are fixed along the chain backbone which results in a decrease in the dimensions of the polymer molecule. The viscosity diminishes as long as the chain continue to shrink.

It has been found previously (U.S. Pat. Nos. 4,460,758 and 4,540,496), for example, that intrapolymer complexes, composed of a nonstoichometric ratio of cationic and anionic monomeric units, can be useful in viscosifying aqueous solutions systems (as required in a variety of well control and workover fluids; i.e., water based drilling fluids and acid gelation systems). More importantly, these polymeric materials possess higher viscosity in acid, base or salt solution than in the corresponding fresh water system. Even more interesting is the observation that these polymer materials show a corresponding viscosity enhancement as the concentration of the dissolved acid, base or salt is increased, even though the polyampholyte contains a substantial amount of dissociable charge. As explained earlier, these viscosity results are unexpected since the general tendency of charged macromolecules in these types of aqueous solutions shows a marked decrease in thickening efficiency.

Furthermore, in recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complexes. The counterions are now free to diffuse into the bulk solution. Normally, phase separation occurs upon prolonged standing in these higher-charged density complexes. As a result, these materials have poor viscosification properties. In previous U.S. patents, it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems.

Even more interesting is the unique and unexpected result that these soluble interpolymer complexes are capable of enhancing the viscosity of aqueous solutions under relatively broad shear conditions. With these unique polymeric materials, dilatant behavior occurs in aqueous fluids which are of extreme technological utility. It is further noted that under the identical experimental conditions, the viscosity of the individual copolymer components show the normal shear thinning behavior. In all of the above instances, the chain conformation can be approximated as a random coil.

This instant invention teaches that a novel family of water soluble hydrophobically-associating rod-like polymers are useful in thickening fresh and high brine solutions even under shear. In addition, these polymeric materials have markedly improved and unique solution properties, especially at high ionic strengths, as compared to conventional water soluble polymers.

In addition, this instant invention teaches that a novel family of alkylated copolymers containing a novel family of sulfonate-alkyl containing monomer moieties are useful in viscosifying aqueous solvent systems and more importantly, these polymeric materials have markedly improved and different solution properties as compared to conventional water soluble polymers.

These copolymers are based on, but not limited to, the incorporation of the above anionic, i.e., sulfonate groups and hydrophobic moieties, i.e., alkyl groups into a rigid or semiflexible polyamide backbone structure.

It should be noted at this point that the use of hydrophobic groups on flexible water soluble polymers to enhance the rheological properties of water based fluids has been described. One approach to provide polyacrylamide based systems containing hydrophobic groups is described by Bock, et al., U.S. Pat. Nos. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although the polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrophobic stability. In addition, the need for a surfactant to achieve solubility and thickening efficiency should make such system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids. These water soluble polymers again are best described as random coils.

SUMMARY OF THE INVENTION

The present invention teaches a process for producing water soluble hydrophobically-associating rigid rod polymers that are efficient viscosifiers for a fresh and high ionic strength aqueous solutions. The process relies on the complete solubilization of the initial starting material which is of itself not water soluble. The synthesis occurs in a solvent environment in which the reaction also takes place (see FIG. 1). As a result, under these synthesis conditions a clear, uniform, homogeneous mixture forms and remains so throughout the entire procedure.

The polymers which may be isolated from the reaction mixture form aqueous solutions which are very effective viscosifiers of water or brine, having molecular weights such that their intrinsic viscosities are high enough for effective viscosification, typically greater than 0.1 dl/g.

It should be noted that the starting polymer for this synthetic procedure is a rigid rod polymer produced by the DuPont Company called Kevlar. This material is useful as a high modulus/high tensile strength fiber in a large number of applications. Incidentally, Kevlar is soluble only in sulfuric acid which prevents facile modification of its chemical structure. The approach presented in FIG. 1 overcomes these problems however. The solvent used in this instance is dimethylsulfoxide (DMSO) in which sodium hydride (NaH) and the Kevlar is added. Subsequent reaction with a sultone, alkyl bromide and subsequent neutralization with a base results in the final polymer product via classical nonsolvent isolation procedures.

The water soluble alkyl-containing, i.e., hydrophobically-associating group, polymers produced in this invention are characterized by the formula in FIG. 1. The level of sulfonation is directly proportional to the level of butane sultone (or other alkyl sultones) added to the rigid-rod chain structure.

BRIEF DESCRIPTION OF THE DRAWINGS

FIG. 5 illustrates a typical differential scanning calorimetry scan of the unfunctionalized rigid rod polymer.

FIG. 6 illustrates a typical differential scanning calorimetry scan of a sulfonated-hydrophobically associating rigid rod polymer.

DETAILED DESCRIPTION OF THE INVENTION

Figure 1:
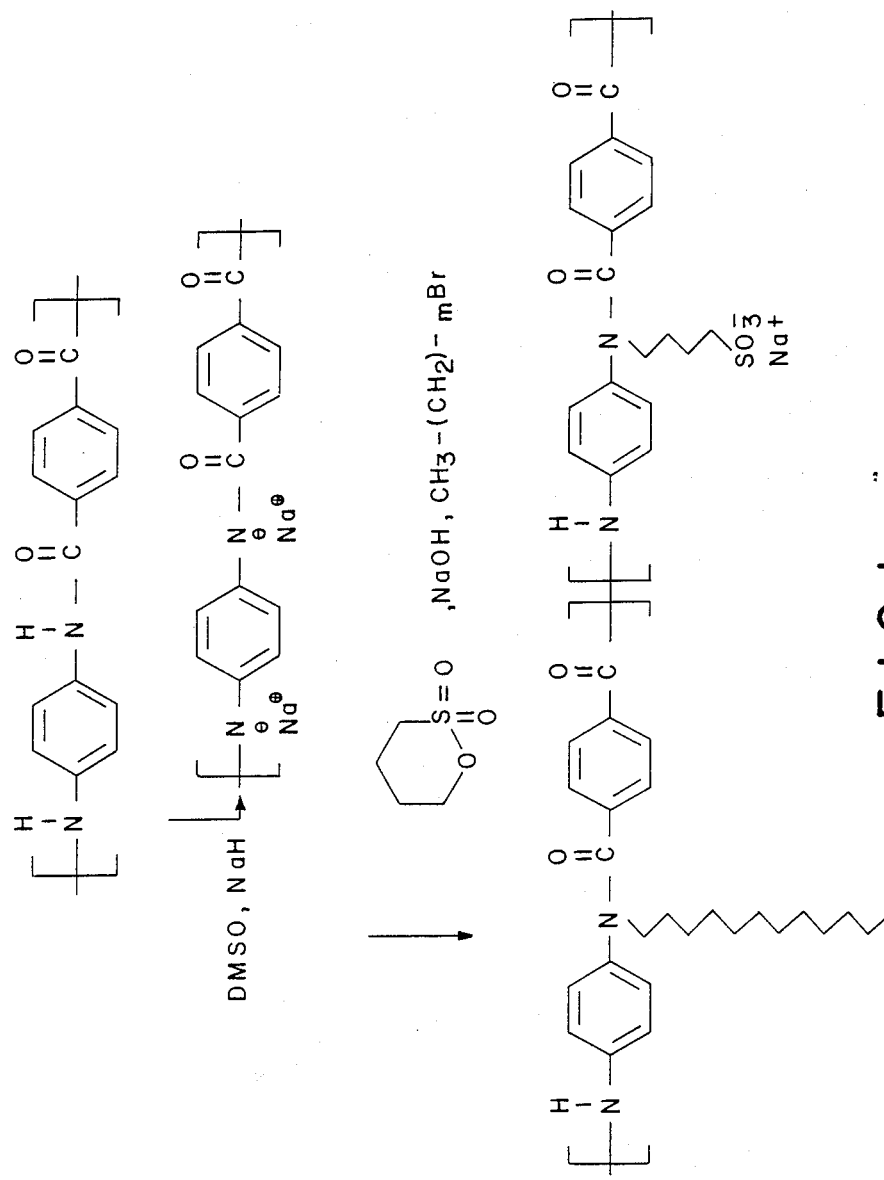
FIG. 1 illustrates in a schematic fashion the specific synthesis route for the preparation of sulfonated-hydrophobically, i.e. alkyl containing, associating rigid rod polymers. Note DMSO denotes dimethylsulfoxide.

The scope of this invention, permits the synthesis of a large viscosity of water soluble hydrophobically-associating rod-like polymers based on an polyamide structure. Typical structures for the polymer in this invention includes aromatic based polyamides, both substituted and unsubstituted, in which the hydrogen atom in the amide linkage is substituted with a sulfonate-containing and/or alkyl-containing moieties. In this invention, the sulfonation procedure is accomplished with alkyl sultones, primarily, propane sulfone and butane sultone wherein a ring opening of the sultone occurs. The alkylation procedure is accomplished with alkyl halides. The synthesis relies on the reaction and subsequent reaction of the sultone and alkyl halide with the derivatized rod-like polyamide. These anionic, i.e. sulfonate, derivative are formed without the utilization of any other sulfonating agents. The reaction mixture is clear, isotropic and homogeneous.

An additional important feature is that the resultant polymer possess both an anionic charge and segments of the rod-like chain that remains unsulfonated. These latter units are insoluble in water and therefore gives a hydrophobic unit to the polymer chain. This is accomplished without the necessity of further chemical post-treatment. The precise level of sulfonation directly permits, therefore, a degree of control of the final polymer structure and of course, physical properties. In addition, the addition of pendent alkyl groups gives an additional degree of control over the level, i.e., intensity, of the hydrophobic interactions.

The rod-like polyamides are produced through well-known condensation reaction procedures.

Typical polyamide structures that are useful in this instant invention are disclosed in U.S. Pat. Nos. 3,063,966; 3,006,899; 3,943,110; 3,600,350 and 3,673,143, all of which are herein incorporated by reference.

The water soluble and brine soluble rod-like polymers which are produced by this sulfonation procedure in this instant invention having recurring units of the formula:

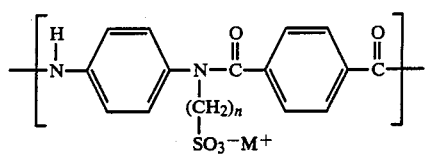

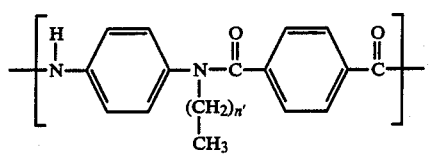

wherein n and n' is preferably 2 to 22 straight chained or branched chained alkyl or cycloalkyl group, more preferably 3 to 12 and most preferably 3 to 8. Typical, but non-limiting examples of preferred alkyl groups are propyl, butyl, octyl, decyl, dodecyl and steryl groups. The level of sulfonation is preferably about 20 to about 100 mole %, more preferably about 40 to about 95 mole %, and most preferably about 50 to about 90 mole %. M is a tertiary amine or a metal cation selected from the group consisting of alumina, iron, lead, Groups IA, IIA, IB and IIB of the Periodic Table of Elements. The level of alkylation is preferably about 1 to about 60 mole %, more preferably about 1.5 to about 50 mole %, and most preferably about 2 to about 40 mole %. The water soluble rod-like polymers have an average number molecular weight of about $10^3$ to about $10^7$, more preferably about $10^3$ to about $10^6$ and most preferably about $10^3$ to about $10^5$.

The polymers of the instant invention are water soluble or brine soluble rod-like polymers characterized by the formula:

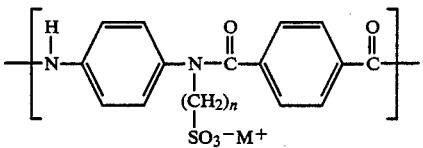

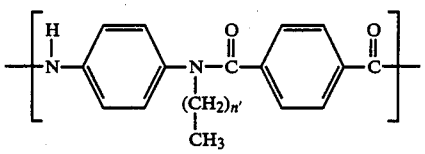

wherein n and n' is a 2 to 22 straight chained or branched chained alkyl or cycloalkyl group, and the level of sulfonation is about 20 to about 100 mole %, and M is a tertiary amine or a metal cation selected from the group consisting of aluminum, iron, lead, Groups IA, IIA, IB and IIB of the Periodic Table of Elements and level of alkylation is about 1.0 to about 60 mole %.

The polymeric solutions of the instant invention comprising water, and about 0.1 to 90% mole % of a water soluble or brine soluble rod-like polymer characterized by the formula:

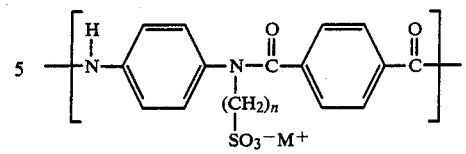

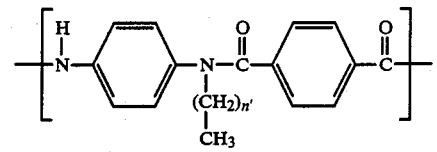

wherein n and n' is a 2 to 22 straight chained or branched chained alkyl or cycloalkyl group, and the level of sulfonation is about 20 to about 100 mole %, and M is a tertiary amine or a metal cation selected from the group consisting of alumina, iron, lead, Groups IA, IIA, IB and IIB of the Periodic Table of Elements and the level of alkylation is about 1.0 to about 60 mole %.

The process for forming a water soluble or brine soluble rod-like polymer of the instant invention which are characterized by the formula:

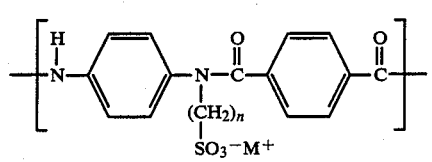

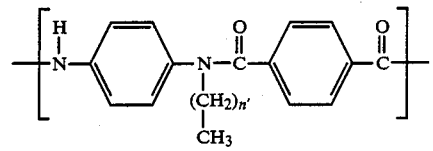

wherein n and n' is 2 to 22 straight chained or branched chained alkyl or cycloalkyl group, and the level of sulfonation is preferably about 20 to about 100 mole %, and M is a tertiary amine or a metal cation selected from the group consisting of aluminum, iron, lead, Groups IA, IIA, IB and IIB of the Periodic Table of Elements, and the level of alkylation is about 1.0 to about 60 mole % which comprises the steps of dissolving NaH in dimethyl sulfoxide; dissolving about 1.0 to about 40 of an aromatic polyamide chaaacterized by the formula:

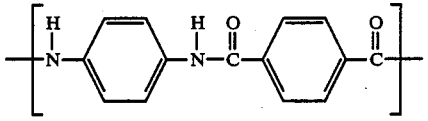

to form a solution and stirring said solution at about 25° to about 80° C. until a homogeneous solution is formed which contains an intermediate characterized by the formula:

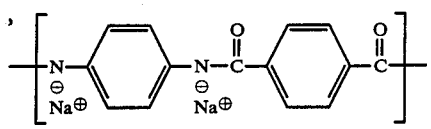

and adding a mixture of sodium hydroxide, an alkyl halide and an alkyl sultone to said solution of said intermediate said alkyl halide and said alkyl sultone reacting with said intermediate to form said water soluble rod-like polymers.

DESCRIPTION OF THE PREFERRED EMBODIMENT

Example 1

Typical Synthesis Technique

A 200 ml, four-necked, separable flask equipped with condenser, drying tube, nitrogen inlet, dropping funnel, and stirrer was used. The apparatus was swept by dry nitrogen. A 0.08125 mole (3.9) portion of purified sodium hydride initially a 50% suspension in paraffin) and 300 ml of DMSO (dried over a molecular sieve) were placed in the flask at 55° C.. The temperature rose to 60° C. after 20 minutes, and the mixture was maintained at 55° C. under nitrogen with stirring. About 240 minutes was required for the sodium hydride to be consumed completely. A 0.0833 mole amide unit (10.0) of Kevlar was added at 55oC to the reaction mixture which was cooled, and stirring was continued at 55° C. for 12 hours. Then, 6.91 mls (butane sultone) and 3.63 mls dodecyl bromide was added and the mixture stirred at 55° C. for 16 hours. The polymer was precipitated in a large excess of water, filtered, and washed several times with water and acetone alternately. After the isolated product was dried at 373 K for 10 hours in a vacuum oven, the light yellow powder of the product was obtained with a yield of 3.9g (96%). The sulfonated product is neutralized with an aqueous solution of sodium hydroxide via well known neutralization techniques. Elemental analysis indicates that the sulfonation level is about 75 mole %, while the alkyl substitution is about 15 mole %.

Figure 2:
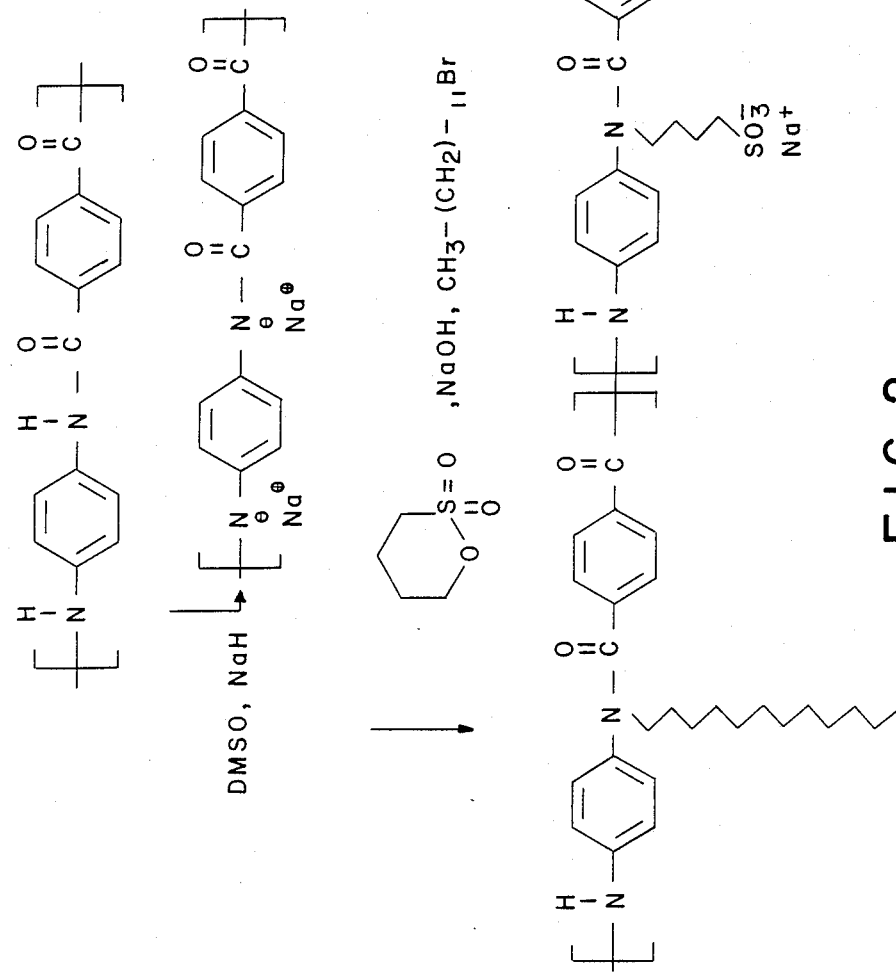
FIG. 2 illustrates in a schematic fashion the specific synthesis route for the preparation of a sulfonated-hydrophobically associating rigid rod polymer containing a dodecyl pendent group.
Figure 3:
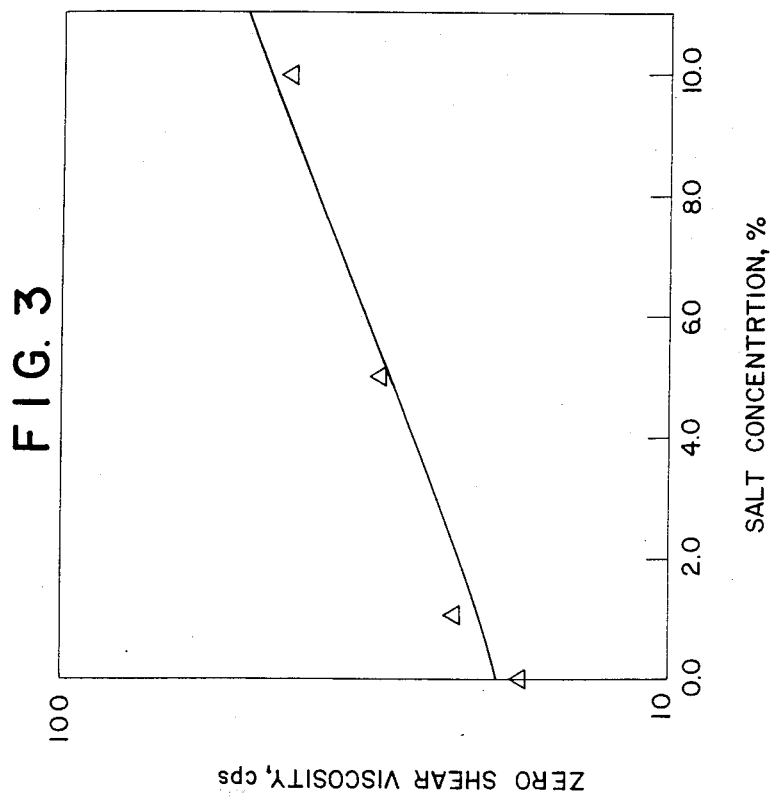
FIG. 3 illustrates the zero shear viscosity-salt (NaCl) concentration dependence of a sulfonated-hydrophobically associating rigid rod polymer.

The specific reaction pathway is shown in FIG. 2.

Example 2

Typical Rheological Results (Summary)

FIG. 2 confirms:
1. Sulfonated and alkyl-containing Kevlar is wholly water soluble.
2. Soluble hydrophobically-associating rod-like polymers are effective viscosifiers in aqueous media.
3. Shear thinning characteristics are observed over a broad shear rate regime.
4. Viscosity enhancement is observed with increasing ionic strength of the aqueous solution.
5. The lowest sulfonation level produces the most viscous solution and vice versa.
6. Increases in polymer concentration markedly increases viscosificaiton efficiency.
7. Insolubility occurs at sulfonation levels <40 mole %.
8. Hydrophobic interactions controls rheological properties especially at low sulfonation levels.

Example 3

Figure 4:
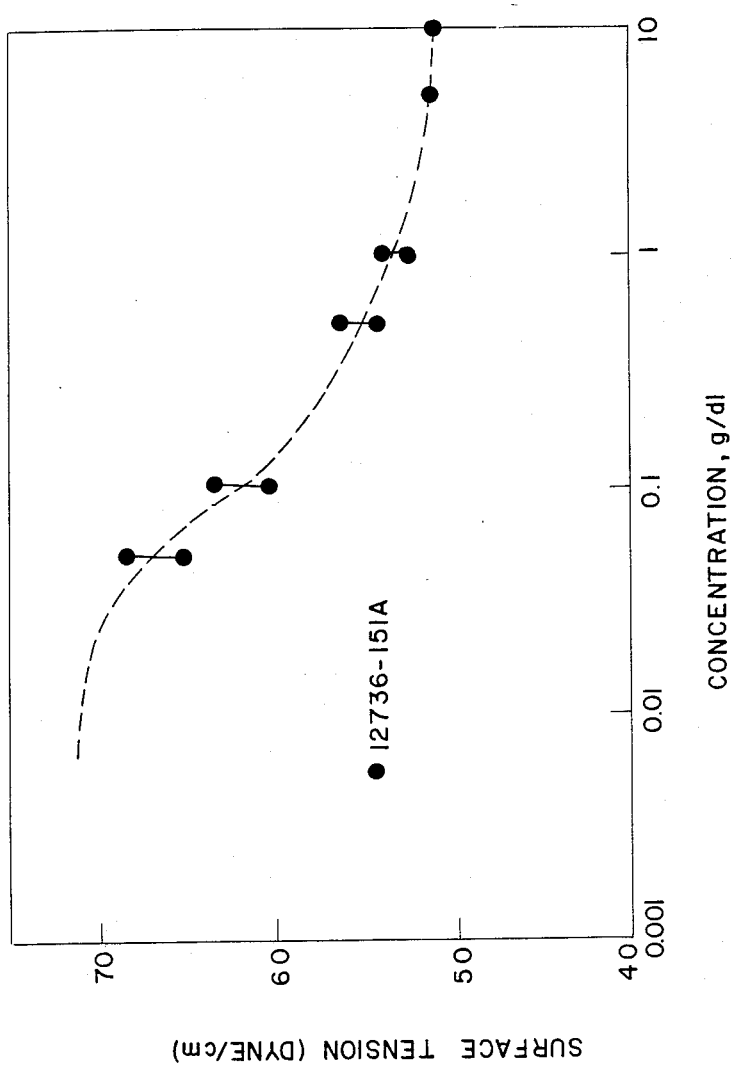
FIG. 4 illustrates the surface tension-polymer concentration dependence of a sulfonated-hydrophobically associating rigid rod polymer.

FIG. 4 shows the effect of the hydrophobic associations, i.e., due to the alkyl pendent groups, on the surface tension of the fresh water solution. The surface tension is plotted as a function of polymer concentration. The data can be summarized as follows: (Note 12736-151A is the polymer synthesized according to example 2).
1. marked surface tension reduction occurs with these hydrophobically-associating, sulfonated rod-like polymers.
2. surface tension reduction is directly proportional to the polymer concentration.
3. level of alkyl substitution and sulfonate level determines the magnitude of the surface tension at comparable molecular weight and polymer concentration.
4. physical properties of these solutions is directly related to alkyl and sulfonate content, polymer concentration and molecular weight distribution.
5. an apparent critical micelle concentration (CMC) is observed at about 5 g/dl. The CMC changes with the parameters given in 4).

Example 4

Thermal Stability

FIGS. 5 and 6 shows the thermal behavior of the as received Kevlar and a sulfonated-alkyl substituted version (Example 2) respectively. As anticipated, the Kevlar material begins to soften around 760° K. This data parallels quite nicely, the well known thermal stability of these materials. Interesting, the thermal stability of the sulfonated polymers begin to soften around 640° K.—a unique property of these water soluble hydrophobically-associating polymers.

In summary, the use of these novel sulfonate, i.e., anionic, and alkyl substituted rod-like polymer compositions to impart improved rheological properties to fresh and high brine fluids is described. The properties of the aqueous fluids containing these rod-like polymers can be varied over a broad range due to the ability to readily change a number of compositional variables in the polymer structure, i.e., level of sulfonation, molecular weight, alkyl level, length of the alkyl pendent group.

The rod-like polymers are useful as rheological control agents in a variety of oil and gas drilling operations. Included in this category are a variety of well control and workover fluids, fracturing fluids, gelation agents, brine viscosifiers, completion fluids, drag reduction additive, enhanced oil recovery additive, water borne coatings, water based lubricants and the like.

What is claimed is:

1. A water soluble or brine soluble rod-like polymer having recurring units of the formula:

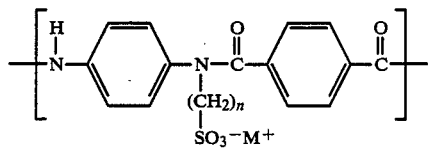

-continued

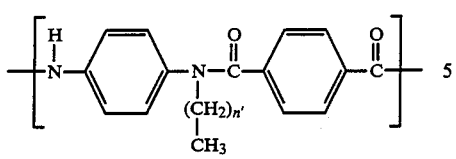

wherein n and n' are a 2 to 22 straight chained or branched chained alkyl or cycloalkyl group, and the level of sulfonation is about 20 to about 100 mole and M is a tertiary amine or a metal cation selected from the group consisting of aluminum, iron, lead, Groups IA, IIA, IB and IIB of the Periodic Table of Elements and level of alkylation is about 1.0 to about 60 mole %.

2. A solution comprising:
   (a) water;
   (b) about 0.1 to 90% mole % of a water soluble or brine soluble rod-like polymer having recurring units of the formula:

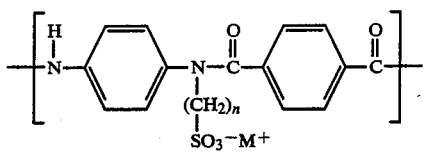

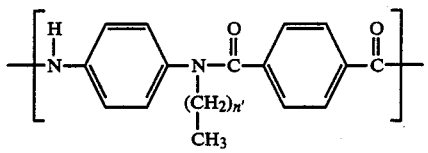

wherein n and n' are a 2 to 22 straight chained or branched chained alkyl or cycloalkyl group, and the level of sulfonation is about 20 to about 100 mole %, and M is a tertiary amine or a metal cation selected from the group consisting of alumina, iron, lead, Groups IA, IIA, IB and IIB of the Periodic Table of Elements and the level of alkylation is about 1.0 to about 60 mole %.

3. A process for forming a water soluble or brine soluble rod-like polymer having recurring units of the formula:

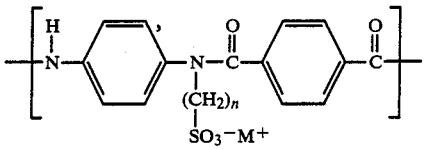

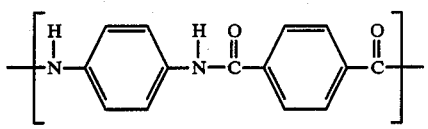

wherein n and n' are 2 to 22 straight chained or branched chained alkyl or cycloalkyl group, and the level of sulfonation is about 20 to about 100 mole %, and M is a tertiary amine or a metal cation selected from the group consisting of aluminum, iron, lead, Groups IA, IIA, IB and IIB of the Periodic Table of Elements, and the level of alkylation is about 1.0 to about 60 mole % which comprises the steps of:
   (a) dissolving NaH in dimethyl sulfoxide;
   (b) dissolving about 1.0 to about 40 of an aromatic polyamide having recurring units of the formula:

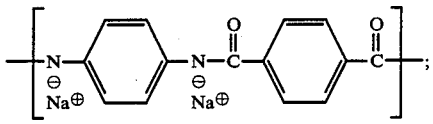

to form a solution and stirring said solution at about 25° to about 80° C. until a homogeneous solution is formed which contains an intermediate having recurring units of the formula:

(c) adding a mixture of sodium hydroxide, an alkyl halide and an alyl sultone to said solution of said intermediate said alkyl halide and said alkyl sultone reacting with said intermediate to form said water soluble rod-like polymers.

* * * * *